(12) United States Patent
Kohler et al.

(10) Patent No.: US 8,761,380 B2
(45) Date of Patent: Jun. 24, 2014

(54) ADAPTIVE ESTIMATED WAIT TIME PREDICTOR

(75) Inventors: Joylee Kohler, Northglenn, CO (US); Robert C. Steiner, Broomfield, CO (US); Andrew D. Flockhart, Thornton, CO (US); William H. Jolicoeur, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 13 days.

(21) Appl. No.: 13/407,536

(22) Filed: Feb. 28, 2012

(65) Prior Publication Data

US 2013/0223619 A1   Aug. 29, 2013

(51) Int. Cl.
*H04M 3/00* (2006.01)
*H04M 5/00* (2006.01)

(52) U.S. Cl.
USPC .................................. 379/266.06; 379/265.08

(58) Field of Classification Search
USPC ............. 379/265.02, 265.08, 266.03, 266.06
See application file for complete search history.

(56) References Cited

U.S. PATENT DOCUMENTS

| 5,506,898 | A | 4/1996 | Costantini et al. |
| 6,694,009 | B1 | 2/2004 | Anderson et al. |
| 6,714,643 | B1 * | 3/2004 | Gargeya et al. .......... 379/266.06 |
| 6,754,333 | B1 | 6/2004 | Flockhart et al. |
| 7,778,937 | B2 * | 8/2010 | Ferrara et al. ................ 705/304 |
| 7,949,123 | B1 | 5/2011 | Flockhart et al. |
| 2007/0127690 | A1 * | 6/2007 | Patakula et al. .......... 379/265.05 |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |
| 2011/0255683 | A1 | 10/2011 | Flockhart et al. |

* cited by examiner

*Primary Examiner* — Ahmad Matar
*Assistant Examiner* — Nafiz E Hoque
(74) *Attorney, Agent, or Firm* — Sheridan Ross P.C.

(57) ABSTRACT

Systems and methods for providing adaptive estimated wait time predictions for work items are provided. More particularly, a processor-enabled module may select a best estimated wait time algorithm from among a plurality of estimated wait time algorithms that meets the accuracy and calculation resource conditions of a contact center based on rules. Furthermore, the conditions of a contact center may change at times and as a result the selection of which estimated wait time algorithm is considered best will adapt to suit the contact center change. In addition, the selected best estimated wait time prediction can be provided to client communication devices.

20 Claims, 5 Drawing Sheets

| EWT Algorithm Identifier (504) | EWT Algorithm(s) (508) | Calculation Resource Rating(s) (512) | Accuracy Rating(s) (516) |

| Condition Data (604) | Accuracy Threshold Rule(s) (608) | Calculation Resource Limit Rule(s) (612) | Calculation Resource Threshold Rule(s) (616) | Actual Wait Time (620) | Historical Data (624) | Comparisons (628) |

ADAPTIVE ESTIMATED WAIT TIME PREDICTOR

FIELD

The present invention is directed to providing a preferred estimated wait time predictor to users requesting access to a resource.

BACKGROUND

Contact centers are systems that enable agents to serve incoming and/or outgoing calls, with the calls being distributed and connected to whichever of the agents is available to handle the call. When no agents are free and available to handle an incoming call, additional incoming calls are typically placed in a holding queue to await an available agent. Unfortunately, contact center holding queues offer no visual indication of an expected wait time to a caller (like a physical queue does for a person waiting in a line), and as a result the callers may experience frustration and impatience while holding. After some time has passed callers may even abandon their call, solely because they do not know how long they must wait in order to connect with an available agent.

It is a feature of modern contact centers to provide callers with estimated wait times while they are holding in a given queue. Among other things, some of the benefits achieved by providing callers with estimated wait times include increasing customer satisfaction as well as trust between the caller and the contact center while at the same time dramatically reducing the number of abandoned calls that were placed into a given holding queue. However, it is the accuracy of a predictor that is critical to providing callers with trusted estimated wait times.

To provide callers with more accurate estimated wait time predictions, contact centers may utilize a number of different predictors. One example of a prior art wait time prediction solution is described in U.S. Pat. No. 5,506,898, the entire contents of which are hereby incorporated herein by reference. In general, the '898 reference describes a methodology for predicting wait time in a contact center queue of contacts. As can be appreciated, these wait time predictors may vary in their overall mathematical complexity as well as their demand on available resources (e.g., processing power, time to process, storage, etc.). For example, a contact center may utilize a predictor that determines estimated wait time by calculating the average call holding time for all calls of a particular class, and then subtracting the time an agent has spent on the call up to the point at which the estimate is made. Other predictors may utilize highly complex formulas and algorithms to provide very accurate results. However, these complex predictors tend to utilize more processing power and contact center resources.

Typically, a contact center utilizes a single algorithm type to predict wait times. Therefore, the amount of resources used by the algorithm is generally fixed. It would be advantageous to use less complex algorithms at times when the generated estimated wait time result would only vary slightly from a result generated by a more complex algorithm.

SUMMARY

The present disclosure is directed to solving these and other problems and disadvantages of the prior art. Generally, according to embodiments of the present disclosure, a work item (e.g., a call) is routed to a server or switch for handling. If an agent is not currently available to handle the work item, that work item is placed in a queue. For work items placed in a queue, a plurality of estimated wait times is then calculated by different estimated wait time algorithms, and stored. At least one of these estimated wait times may be presented to a person (e.g., a customer or caller) associated with the work item. The actual wait time of one or more calls in a queue is recorded and stored. Using the actual wait time and the estimated wait times generated by each algorithm, the algorithms may be rated for one or more of accuracy and calculation resource use. Analyzing this rating may allow a contact center to select the best value estimated wait time algorithm to apply to one or more given scenarios. In one embodiment, the contact center may select a new estimated wait time algorithm to present one or more future estimated wait times to a person.

As can be appreciated, the implementation and/or complexity of estimated wait time (EWT) algorithms may vary depending on the calculation resources available to a contact center, the media types associated with a contact center, and/or the needs of a particular contact center. Moreover, the resources and needs of a contact center may vary with time, traffic, agent status, contact type, and different conditions. It is an aspect of the present disclosure to address these changing conditions by providing an adaptive solution to the use of EWT predictor algorithms in a contact center. By analyzing the conditions of the contact center (including calculation resources available, time to process, storage concerns, predetermined rules, contacting parties, agents, and/or the desired accuracy of the EWT prediction) the EWT assignment engine is configured to adaptively, and in some cases automatically, select the EWT algorithm with the best "rating" for future implementation. The rating of a chosen EWT predictor can be based on a number of factors (including accuracy thresholds, calculation resource thresholds, calculation resource limits, ratios, rules, demand, predetermined settings, and combinations thereof).

Contact centers generally implement one type of EWT algorithm at a time to predict wait times. Because providing customers with accurate EWT predictions is critical to the success of a call center's customer service, the contact center generally uses more accurate EWT algorithms. However, increasing the accuracy of an EWT prediction algorithm is typically coupled with an increase in the algorithm complexity and its use of valuable calculation resources. Among other things, calculation resources may include processor capabilities, time to process at least one algorithm, and data storage and/or retrieval. Although some less-complex EWT algorithms may provide predictions that may be adequate for simple scenarios, the contact center cannot afford to use a less-complex EWT algorithm for all scenarios. Therefore, different scenarios would benefit from using different EWT algorithms to provide at least one appropriate EWT prediction to suit contact center conditions.

It is one aspect of the present disclosure to provide an adaptive EWT predictor that is capable of selecting from among a plurality of EWT algorithms to meet the ever-changing demands of a contact center. For instance, in the event that a given contact center receives a large number of calls from a valuable customer during a specific time period, an algorithm may be employed to provide that customer with very accurate EWT predictions. In contrast, during times where accuracy is not considered to be as important as calculation resources, the adaptive EWT predictor may determine that a less-complex and slightly less-accurate EWT algorithm should be implemented to provide the EWT prediction. Alternatively or additionally, the adaptive EWT predictor may determine that an EWT algorithm should be used that balances the overall EWT prediction accuracy with the use of contact center calculation resources.

Embodiments of the present disclosure are directed to using multiple EWT algorithms to predict queue wait times, compare and/or contrast these predicted wait times with actual wait times, rate each of the algorithms, and select the best rated, or preferred, algorithm to apply in present and/or future EWT predictions. This adaptive EWT predictor may be applied to call queues and/or scenarios in real-time, near real-time, and/or in simulations. Moreover, these EWT algorithms may be run simultaneously, semi-concurrently, sequentially, and/or individually. It is anticipated that these EWT algorithm calculations may be made on-board (using at least some of the available contact center resources) or off-board (substantially separate from the available contact center resources).

In some embodiments multiple preferred EWT algorithms may be deployed simultaneously, where each preferred EWT algorithm may be used for a different subset of skills. For example, a simple EWT algorithm may be deployed for all high-volume skills because achieving a given accuracy threshold may not require the use of a complex EWT algorithm. At the same time, a more complex EWT algorithm may be deployed for all low-volume skills where a more sophisticated algorithm may be necessary to achieve the desired accuracy threshold. In accordance with the present disclosure, the multiple preferred EWT algorithms may be applied to similar and/or different work items.

It is anticipated that the adaptive EWT predictor may record and associate at least one contact center state with one or more preferred EWT algorithm. For instance, after one or more of the EWT algorithms have been run against a set of provided data, the results of the one or more EWT algorithms may be associated with that data set. In some cases, the adaptive EWT predictor may determine that a slightly lower accuracy rating is more suitable to apply to a current and/or future problem set. This determination may be made by the adaptive EWT predictor comparing the accuracy of a previous EWT prediction and the actual wait time experienced. The comparison may result in a rating of one or more EWT algorithms that can be used to select an appropriate algorithm for current and/or future queues. An example of a sample algorithm rating is a ratio between the EWT prediction result accuracy and the calculation resources required to implement the EWT algorithm.

Additional features and advantages of embodiments of the present invention will become more readily apparent from the following description, particularly when taken together with the accompanying drawings.

BRIEF DESCRIPTION OF THE DRAWINGS

FIG. 5 is a block diagram depicting a second data structure used in accordance with embodiments of the present disclosure; and FIG. 6 is a block diagram depicting a third data structure used in accordance with embodiments of the present disclosure.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to have a team of agents engage in training while servicing a contact.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
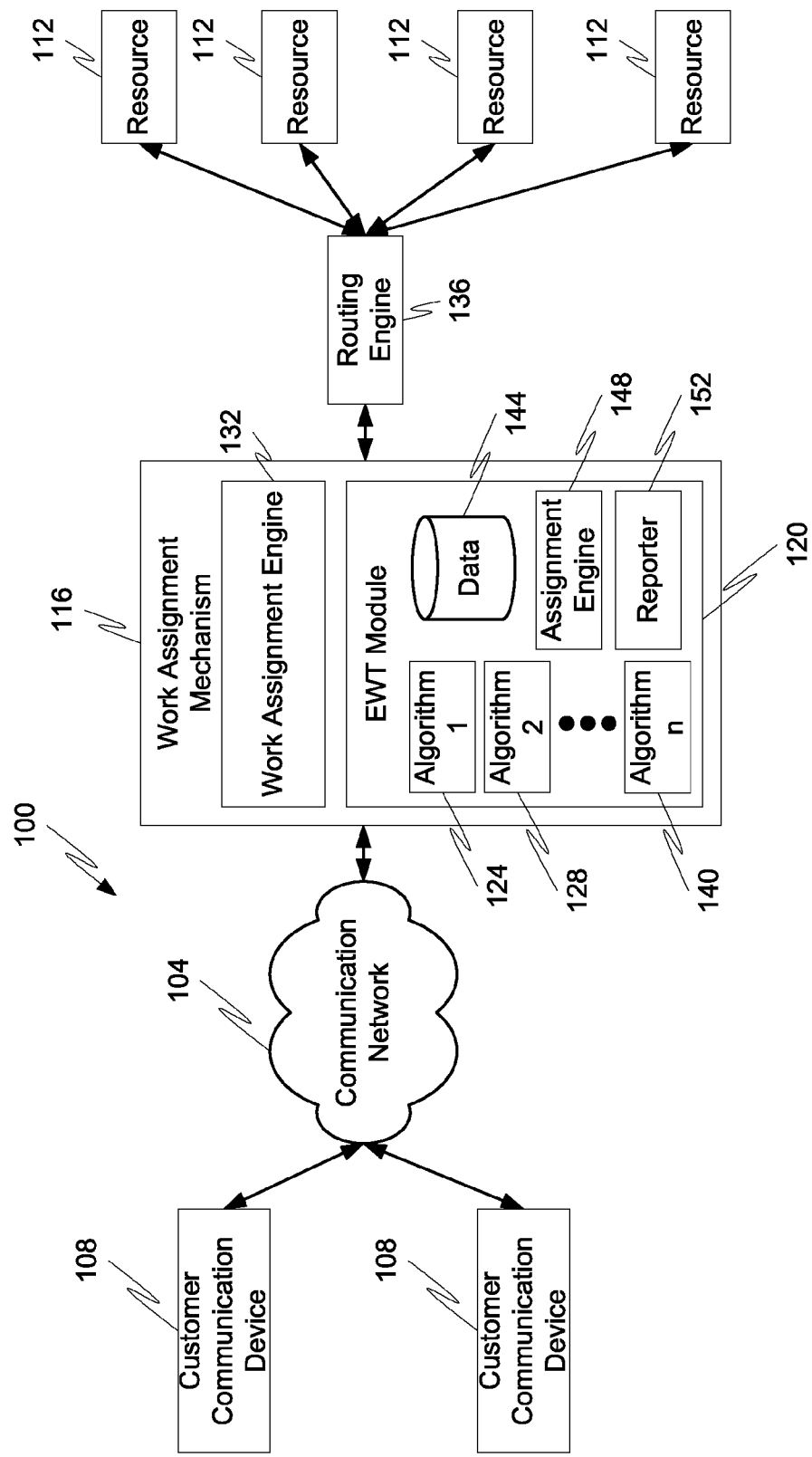
FIG. 1 is a block diagram depicting a communication system in accordance with an embodiment of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/ wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item assignment decision to a routing engine 128 to connect the communication device 108 which initiated the communication with the assigned resource 112.

Although the routing engine 136 is depicted as being separate from the work assignment mechanism 116, the routing engine 136 may be incorporated into the work assignment mechanism 116 or its functionality may be executed by the work assignment engine 132.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 136. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 132 which enables the work assignment mechanism 116 to make intelligent routing decisions for work items. In some embodiments, the work assignment engine 132 is configured to administer and make work assignment decisions in a queueless contact center, as is described in U.S. patent application Ser. No. 12/882,950, the entire contents of which are hereby incorporated herein by reference.

More specifically, the work assignment engine 132 can determine which of the plurality of processing resources 112 is qualified and/or eligible to receive the work item and further determine which of the plurality of processing resources 112 is best suited to handle the processing needs of the work item. In situations of work item surplus, the work assignment engine 132 can also make the opposite determination (i.e., determine optimal assignment of a work item to a resource). In some embodiments, the work assignment engine 132 is configured to achieve true one-to-one matching by utilizing bitmaps/tables and other data structures.

The work assignment engine 132 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 132, the work assignment mechanism 116 may also comprise an Estimated Wait Time (EWT) module 120. The EWT module 120 may comprise the functionality to estimate wait times for each work item waiting to be assigned to a resource 112, even though the work items are not in a traditional FIFO queue.

More specifically, the EWT module 120 may comprise one or more algorithms 124, 128, 140, a data storage medium 144, an assignment engine or analyzer 148 and a reporter 152. In some embodiments, the assignment engine or analyzer 148 may be configured to analyze all work items in the contact center that have not yet been assigned to a resource 112 and determine an estimated wait time for each of the work items. The analyzer 148 may comprise the capability to determine estimated wait times for work items which have specific service time and completion goals, where the work items potentially have different service time and completion goals.

The reporter 152 may be configured to generate and send notifications to the communication devices 108 of the estimated wait time determined by the assignment engine or analyzer 148. In some embodiments, the reporter 152 is configured to receive the estimated wait time determined by the assignment engine or analyzer 148 and prepare one or more messages containing the estimated wait time. The messages may then be transmitted via the communication network 104 to the communication devices 108. In some embodiments, the reporter 152 may be configured to prepare notifications in different media types and the type of media selected for the reporting message may depend upon the media type of the work item. For example, if the work item corresponds to a voice call, then the reporting message may comprise a voice message that is transmitted to the communication device 108. As another example, if the work item corresponds to an email contact, then the reporting message may comprise a separate email message that is sent in reply to the original email message or it may comprise a posting on a website that is retrievable by the communication device 108.

The EWT module 120 may apply one or more of the algorithms 124, 128, 140 to at least one work item or a queue of work items to determine the EWT in real-time, near-real-time, and/or in a simulated scenario. While operating in real-time, the EWT module 120 may provide the real-time selection and assignment of at least one appropriate algorithm 124, 128, 140 to meet the predetermined criteria associated with a contact center's demands. In general, a contact center may establish limits on calculation resources, which may be stored in the data storage medium 144. The data storage medium 144 may be associated with the EWT module 120. Furthermore, the contact center may set accuracy thresholds and/or calculation resource thresholds, which can also be stored in the data storage medium 144 or elsewhere, that may be used to select and assign at least one balanced EWT algorithm suited to the contact center demands. As can be appreciated a plurality of EWT algorithms may be applied to the same problem (work item) to determine results and/or at least one rating of each algorithm. These results and/or at least one rating may be stored and even used by the EWT module 120 to allow the adaptive selection of EWT algorithms.

It should be noted that the EWT module 120 does not necessarily need to reside in the work assignment mechanism 116. Rather, the EWT module 120, or portions thereof, may be implemented in the routing engine 136 or some other separate server or switch that is connected to the work assignment mechanism 116. It may also be possible to implement multiple EWT modules 120 at different locations in the contact center. Moreover, the functions performed and systems used in conjunction with the EWT module 120 described herein, especially as implemented with a contact center, may also be referred to as an adaptive EWT predictor.

Figure 2:
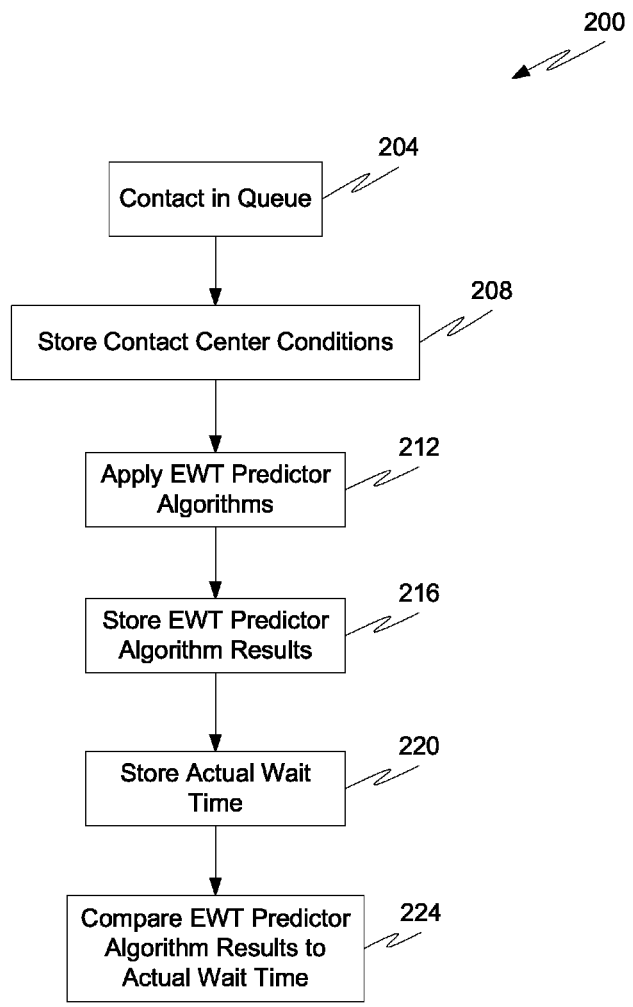
FIG. 2 is a flow chart depicting a first operational embodiment of the contact center in accordance with one embodiment of the present disclosure.

Referring now to FIG. 2, a method of applying a plurality of EWT algorithms to compare and/or contrast multiple results with actual wait times will be discussed in accordance with embodiments of the present disclosure. The method begins at step 204 when a contact is received in queue. It should be noted that receiving a contact in queue may be a simulated, real-time, and/or near-real-time event and may be at least one of a fictitious, real, and/or recording of an actual, contact. Moreover, the contact may be received in the queue by a number of different methods, including but in no way limited to, assignment by the work assignment engine, routing engine, manual placement, computer testing and/or development, and/or any combination thereof.

The method continues at step 208, where the contact center conditions are stored in memory. Contact center conditions may include, but are not limited to, calculation resources available, time to process algorithms, data storage concerns, predetermined rules, contacting parties, agents (including agent availability, number of agents, qualifications of agents, etc.), and/or the desired accuracy of the EWT prediction. As can be expected, there are multiple data structures stored and associated with contact center status and/or work items. It should be noted that these data structures may be used as contact center conditions by the present disclosure.

A plurality of EWT algorithms are applied to one or more work items, or contacts, to provide at least one EWT that is associated with each algorithm at step 212. This plurality of EWT algorithms may be applied during runtime, near-real-time, and/or non-real-time. To simulate conditions for calculating EWT the EWT algorithms may even be applied long after a work item has been assigned. In order to determine which EWT algorithms will be used to provide the one or more EWT predictions, a manual or automatic selection of EWT algorithms may be employed by the EWT module 120. In the event of a manual determination, an individual associated with the contact center may choose several EWT algorithms that will be applied to a problem. This selection may be used to evaluate the functionality of at least one new, existing, and/or future EWT algorithm. Additionally or alternatively, an automatic selection of EWT algorithms may be employed by the EWT module 120 based on current and/or historical data. For instance, a specific group of EWT algorithms may be applied to a work item taking into account at least one of processing speed, accuracy, and balanced use of calculation resources. When at least one of the EWT algorithms is applied to a problem, the EWT module 120 will generate results corresponding to the at least one EWT algorithm and problem. These generated results may be in the form of EWT prediction for the problem.

Exemplary EWT predictors are described in U.S. Pat. No. 5,506,898 to Constantini et al.; U.S. Pat. No. 6,694,009 to Anderson et al.; U.S. Pat. No. 6,754,333 to Flockhart et al.; U.S. Pat. No. 7,949,123 to Flockhart et al.; and U.S. Pat. No. 7,778,937 to Ferrara et al. Each of the aforementioned documents is incorporated herein by this reference in their entirety for all that they teach and for all purposes.

At step 216, the generated EWT algorithm results are stored. The results may be stored in the storage medium 144 of the EWT module 120 or elsewhere associated with the contact center, including the cloud as described above. Furthermore, the results of an individual EWT algorithm may be stored separately from and/or together with the results from other EWT algorithms. In other words, there is nothing that prevents the EWT algorithm results from being stored in one or more of locations and formats, even with different data associations. If the data is stored separately from other results, the results may be stored in a table associated with the EWT algorithm itself. One example of this table would include results that the EWT algorithm generated for different contact center conditions and/or work items. Where the data is stored together with the results of other EWT algorithms, the data may be stored in a table. This table may include one or more of a ranking, order of priority, accuracy field, and other data associated with the adaptive EWT prediction method.

Step 220 describes storing the actual wait time of a work item. This actual wait time may be stored in the EWT module 120 or elsewhere associated with the contact center, including the cloud as previously described. Similar to the results of the EWT algorithms, the data may be stored separately from and/or together with the results of other actual wait times. It is further anticipated that the actual wait times may also be stored with one or more of the EWT algorithms in at least one of the tables mentioned above.

The plurality of EWT algorithm results may be compared to the actual wait time at step 224. Although the comparison step may include the analysis of each and every feature of the data associated with the application of EWT algorithms and actual wait times recorded, one purpose is to determine the accuracy of each algorithm. This comparison may be made on-board by the EWT module 120, contact center processors, and/or made off-board. When coupled with information relating to an EWT algorithm's calculation resources, an accuracy rating may be generated for each algorithm as applied. This comparison step may also include contrasting the accuracy rating of one or more EWT algorithms with the accuracy rating of one or more other EWT algorithms.

Figure 3:
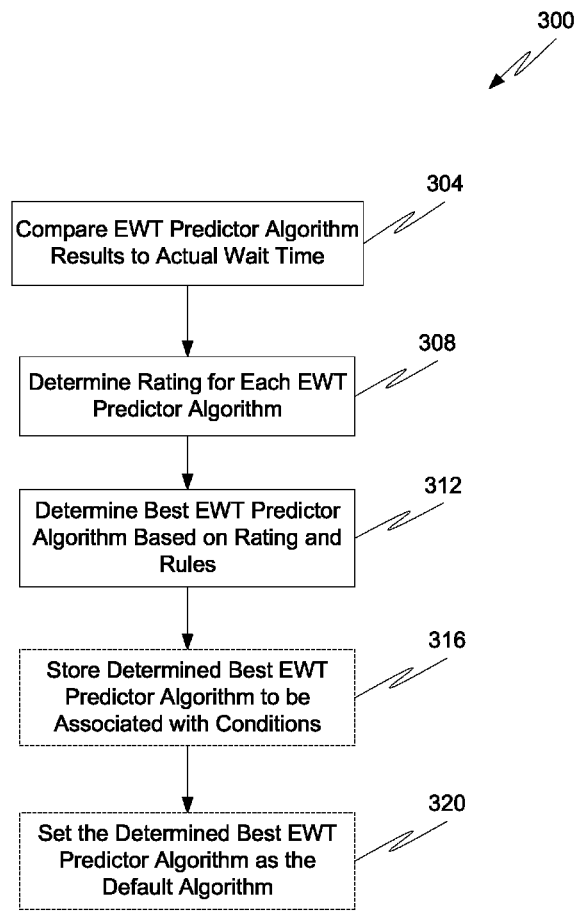
FIG. 3 is a flow chart depicting a second operational embodiment of the contact center in accordance with one embodiment of the present disclosure.

FIG. 3 depicts a method of determining a best EWT predictor algorithm in accordance with embodiments of the present disclosure. The method begins at step 304 by comparing one or more EWT predictor algorithm results to the stored actual wait time, where the actual wait time corresponds to the work item associated with the EWT predicted results. Comparison of the EWT algorithm results to the actual wait time may take many forms, including but in no way limited to preparing the data for accuracy rating, calculation resource rating, and/or balance rating. Additionally or alternatively, the data associated with each EWT algorithm may be tabulated to facilitate quick comparison. Furthermore, individual EWT algorithms, specific groups of EWT algorithms, or even all EWT algorithms may be chosen for comparison to the actual wait time. EWT algorithm predictions that come closest to meeting the actual wait time will be considered more accurate than those whose estimates fall further from the actual wait time.

Because contact centers may determine the criteria used to evaluate EWT algorithms, it is anticipated that the comparison of each selected EWT algorithm may refer to rules and/or other stored data deemed pertinent to comparison. For instance, if the speed of an EWT response is considered most important to a contact center while the EWT result accuracy of estimation is secondary, the EWT algorithm that provides the best balance of between first speed and then accuracy would be desired. In this case, specific rules may be created that sets limits on, among other things, calculation resources, accuracy levels, and even thresholds between compared algorithms. On the other hand, if high accuracy is considered to be more important than the calculation resources necessary to implement a particular EWT algorithm, then specific rules, limits, and/or thresholds may be used that direct such a comparison. These rules, limits, thresholds, and the data associated with them may be stored on-board or off-board.

The method continues at step 308 where a rating is determined for each of the EWT algorithms compared above. In some embodiments, at least one rating is generated that uses the accuracy of results obtained from one or more EWT algorithms and the calculation resources it consumes to generate a ratio for determining balanced "accuracy-to-calculation resources" EWT algorithms. Additionally, the rating determined at step 308 may refer to rules, limits, and/or thresholds stored in memory. These rules, limits, and/or thresholds may allow one or more ratings to be created based on criteria deemed important to a contact center.

Determining the best EWT algorithm to suit an application, work item, and/or work type and specific contact center conditions, may be achieved by referring to ratings and rules (step 312). The rules may allow a plurality of EWT algorithms to be ranked according to predefined criteria set by the contact center. Among other things, a contact center may set criteria to rank EWT algorithms that, balance accuracy with calculation resources, favor accuracy over calculation resource use, favor calculation resource use over accuracy, and/or sets balanced thresholds and limits between accuracy and calculation resource use. For instance, if a plurality of EWT algorithms would be considered ideal (from at least an accuracy standpoint) to apply to a given work item, the method may further refine which EWT algorithm to apply based on rules that consider other factors such as calculation resource usage and the like. Therefore, the "best" EWT algorithm to use for a given situation may be the EWT algorithm with the "best value" to the contact center. In some cases, this best value may require a sacrifice in EWT result accuracy for the benefit of low calculation resource consumption. In other cases, the best value to a contact center may mean employing an EWT algorithm that utilizes less calculation resources where the accuracy of a plurality of EWT results are substantially similar. This customizable rule set utilizing set criteria allows a contact center to dynamically and intelligently tailor the use EWT algorithm applications to meet their changing needs and desires.

When an EWT predictor algorithm is determined to be the best algorithm for a given scenario it is then stored in memory (step 316). Along with the best algorithm, the other EWT algorithms may be stored and even ranked according to previously described methods. All of the EWT algorithms may be associated with contact center conditions, work items, accuracy of results, calculation resources used, balance, and/or combinations thereof. As can be appreciated, the data may be stored in a table. This table may be structured to present the algorithms in a rank order. Moreover, the data table may also include other fields to store determined comparison and/or rating data.

The method continues at step 320, where the EWT module 120 may set the determined "best" EWT algorithm as the default algorithm to be used in current, future, and/or associated work items. Allowing the EWT module 120, or other processor-enabled module, to evaluate the best EWT algorithm to apply to a specific work item provides an adaptive approach to selecting EWT algorithms to meet the ever-changing conditions of a contact center. For instance, if a first EWT algorithm is considered best to address a first problem, but a second problem would benefit from implementing a second EWT algorithm, then the contact center may adaptively select the best EWT algorithm for the work item provided. This approach provides a great benefit to the fixed nature of a contact center applying a single EWT algorithm to a range of work items.

Figure 4:
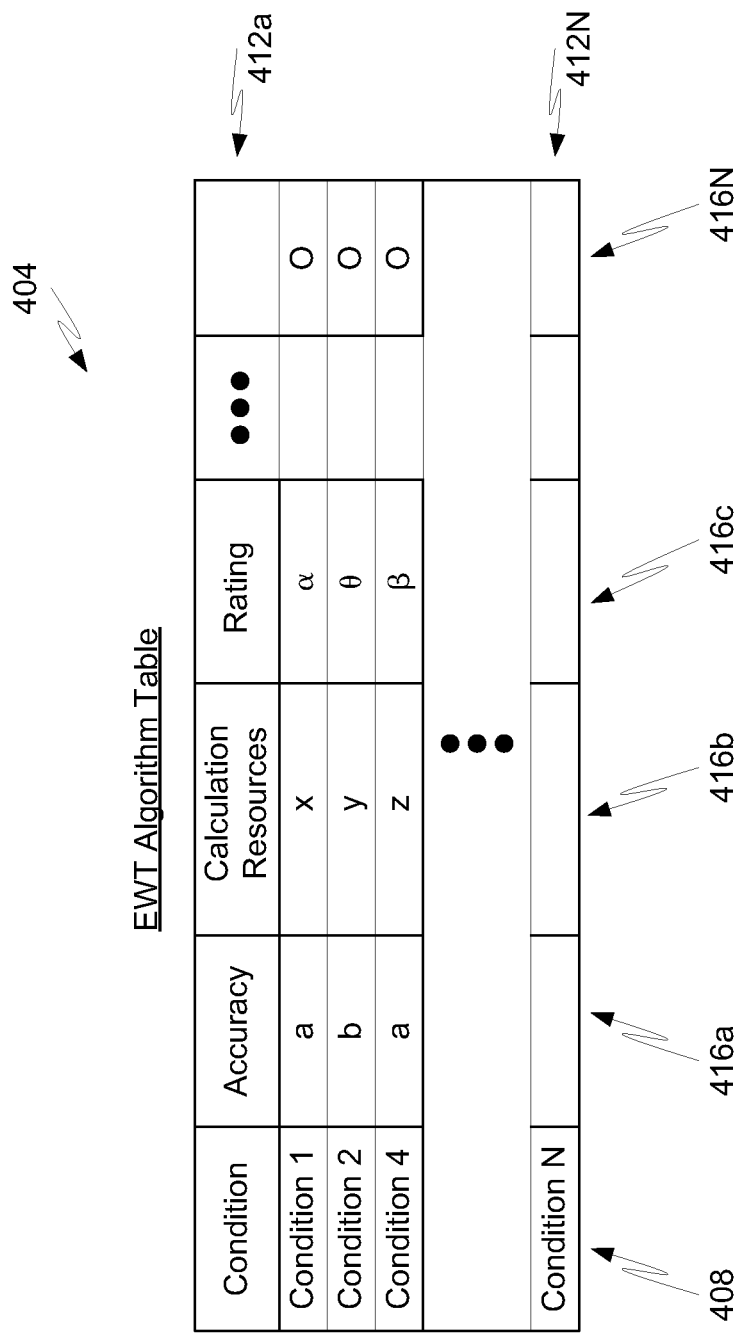
FIG. 4 is a block diagram depicting a first data structure used in accordance with embodiments of the present disclosure.

Referring to FIG. 4 a block diagram of a first data structure 404 is shown in accordance with embodiments of the present disclosure. As shown, the data structure is presented in the form of a table that contains several fields that may be used in the processes outlined herein. It is anticipated that the data structure shown may be associated with an EWT algorithm to store data relating to that EWT algorithm as applied to different conditions and/or work items.

The data structure 404 depicted comprises a plurality of data fields that contribute, at least in part, to the process of adaptive EWT prediction. Examples of such data fields include, without limitation, a condition field 408, an accuracy field 416a, a calculation resources field 416b, a rating field 416c, and other data fields 416N.

The condition field 408 may comprise data used to specify work items, contact center conditions, or combinations thereof. It is expected that conditions may be stored and added as required to cover most, if not all, conditions and/or work items of a given contact center.

The accuracy field 416a may comprise data relating to the accuracy of the EWT algorithm when compared to the actual wait time associated with the condition. This accuracy may be a character, group of characters, bit, group of bits, and/or the like. The accuracy may be calculated from the EWT result and the actual wait time of the work item.

The calculation resources field 416b may comprise data relating to a given algorithm's ability to perform calculations, including without limitation, the processor requirements, time to process, and/or other consumption information. This value may change depending on the complexity of the algorithm, available calculation resources, programming language efficiencies, and the like.

The rating field 416c may comprise data used to specify a relationship between efficiency of the algorithm and accuracy yielded. For instance, the field may contain a ratio of the accuracy to calculation resources for a listed condition. From this data, predictions may be made on which algorithm is better suited to solve specific problems (that is, work items, contact center conditions, and the like). Moreover, the rating data may be used to rank EWT algorithms according to ideal application conditions. These conditions may be stored as rules, limits, thresholds, and/or combinations thereof.

Other data fields 416N may be added to the data structure to include information relating to implementation statistics, predicted success levels, a default EWT identifier, and/or other algorithm data that may be associated with given conditions.

FIG. 5 depicts one example of a data structure 500, which may be generated and used by the various components of the contact center. In particular, the EWT module 120, work assignment engine 132, and/or other components may use the data structure 500 or multiple data structures to facilitate the adaptive EWT prediction described herein. In some embodiments, a single data structure 500 may comprise the data necessary for the EWT module 120 to select from among a plurality of EWT algorithms to implement with a given work item and/or contact center condition. Alternatively, the contact center may employ the use of different data structures that may be similar but do not necessarily have to have the exact same data fields as shown in FIG. 5.

The example data structure 500 depicted comprises a plurality of data fields that contribute, at least in part, to the process of adaptive EWT prediction. Examples of such data fields include, without limitation, an EWT algorithm identifier field 504, an EWT predictor algorithm field 508, a calculation resource rating field 512, and an accuracy rating field 516.

The EWT algorithm identifier field 504 may comprise data used to identify at least one EWT algorithm from another EWT algorithm. This data may include a character, group of characters, bit, group of bits, and/or the like.

The EWT algorithm field 508 may comprise data in the form of mathematical instructions used to determine at least one EWT. It is anticipated that the mathematical instructions may comprise more than one set of data that may require accessing memory and/or contact center conditions in order to formulate an EWT. Moreover, this field may refer to one or more data fields in this or other data structures.

The calculation resource rating field 512 may comprise data used to evaluate the calculation resource efficiency of a particular EWT algorithm. This data may include a character, group of characters, bit, group of bits, and/or the like. It is further anticipated that the determination of the data stored in this field may be made using the complexity of the EWT algorithm and the calculation resources available. In one embodiment, the calculation resource rating may be a value assigned to represent the consumption of a particular EWT algorithm against a known processor. This known processor may be used as a standard by which all EWT algorithms may be compared.

The accuracy rating field 516 may comprise data relating to the accuracy of an EWT algorithm as applied against given work items and/or contact center conditions. This data may be stored in tabular and/or list format and may include accuracy ratings for one or more conditions and work items. The accuracy of a specific algorithm may be stored as a value, character, group of characters, bit, group of bits, and/or the like.

FIG. 6 depicts one example of a data structure 600, which may be generated and used by the various components of the contact center. Similar to the data structure manner described above, the EWT module 120, work assignment engine 132, and/or other components may use the data structure 600 or multiple data structures to facilitate the adaptive EWT prediction described herein. In some embodiments, a single data structure 600 may comprise the data necessary for the EWT module 120 to select from among a plurality of EWT algorithms to implement with a given work item and/or contact center condition. Alternatively, the contact center may employ the use of different data structures that may be similar but do not necessarily have to have the exact same data fields as shown in FIG. 6.

The example data structure 600 depicted comprises a plurality of data fields that contribute, at least in part, to the process of adaptive EWT prediction. Examples of such data fields include, without limitation, a condition data field 604, an accuracy threshold rules field 608, a calculation resource limit rules field 612, a calculation resource threshold rules field 616, an actual wait time field 620, a historical data field 624, and a comparisons field 628.

The condition data field 604 may comprise data used to represent the conditions of a contact center and/or work item. The data in this field may include contact center conditions as described herein. This condition and/or work item data may be referred to as "scenario data" or a "scenario" throughout this disclosure. It is anticipated that data in this field may be stored in a table where attributes of a contact center and/or work item are listed. Furthermore, data may be added to, removed from, and/or edited in this field to accommodate the functions of the contact center.

The accuracy threshold rules field 608 may comprise data used to assist the EWT module 120, and the adaptive EWT prediction process in determining the best suited algorithms for given scenarios. Specifically, the accuracy threshold rules field may contain rules used by the EWT module 120, or other processor-enabled module, in selecting one EWT algorithm over another by providing evaluation criteria as to whether the accuracy rating of at least one EWT algorithm is within an acceptable threshold as defined by the contact center.

Current accuracy threshold rules may be modified, edited, and/or deleted. Moreover, new accuracy threshold rules can be added to the accuracy threshold rule field 608, in addition to or in replacement of existing rules. In some embodiments, the accuracy threshold rules may be different for different work item media types. For example, if a work item is associated with an email media type, the accuracy of EWT results may not be considered highly significant. However, if a work item is associated with a different media type, such as that of a cell phone call, the accuracy of an EWT prediction will be considered very significant in selecting EWT algorithms. Therefore, the accuracy threshold rules may change to address these considerations for various media types.

The calculation resource limit rules field 612 may comprise data relating to set limits on a contact center's calculation resources. In some embodiments, the EWT module 120, or other processor-enabled module, may refer to this data to ensure that specific EWT algorithms are selected based on the limits and rules set forth in this field 612. It is anticipated that the data field 612 may further include logic that may be used in the adaptive EWT prediction process. Furthermore, the data in this field may be set, modified, updated, replaced, and/or deleted automatically when the calculation resources of a contact center change. For instance, if a contact center upgrades its processing power and capabilities, it is one aspect of the present disclosure to detect this upgrade and accordingly modify the limits and/or rules in the calculation resource limit rules field 612. Additionally or alternatively, if the contact center detects an increase in processor consumption and as a result the available processing capability decreases, the limits and/or rules in this field 612 may be modified to adapt to this change. In this scenario, EWT algorithms selected by the EWT module 120 may be selected with a greater concern for processing capabilities.

The calculation resource threshold rules field 616 may comprise data that is used to differentiate between EWT algorithms. In some embodiments, the EWT module 120, or other processor-enabled module, may differentiate between EWT algorithms based on one or more threshold that is set in this data field. For instance, if one of a plurality of EWT algorithms are to be selected, and they all fall within the calculation resource limits described above, the threshold may be used to further differentiate between the EWT algorithms. Similar to the calculation resource limit rules field 612, the data in this field may be set, modified, updated, replaced, and/or deleted automatically when the calculation resources of a contact center change. In the event that the calculation resources will change or have changed, the threshold rules field may become more important in selecting EWT algorithms. Although limit rules may define, among other things, the processing capacity of a contact center the threshold rules in this field may be used in selecting EWT algorithms according to predicted, historical, and/or current patterns in a contact center's conditions.

The actual wait time field 620 may comprise data relating to recorded actual wait times of one or more work items. This data may be used to determine the accuracy of a given EWT algorithm when compared to the results generated by that given EWT algorithm. It is anticipated that data in this field may be stored in a table where actual wait times may be associated with various contact center conditions and/or work items. Furthermore, data may be added to, removed from, and/or edited in this field to accommodate desired functions of the contact center.

The historical data field 624 may comprise data associated with evaluated EWT algorithm results, scenarios, work items, work types, conditions, accuracy levels, calculation resources, and the like. This field may be used by the EWT module 120, or other processor-enabled module, to evaluate the performance of the contact center and/or at least one EWT algorithm that is associated with the aforementioned historical data. It is anticipated that data in this field may be stored in a table. Furthermore, the data in this field may be added to, removed from, and/or edited to accommodate the desired functions of the contact center.

In all of the aforementioned figures it should be appreciated that data generated, retrieved, and/or stored may be used to compile historical data relating to the use of EWT algorithms. This historical data may be stored in at least one of the storage locations previously described. Moreover, the EWT module 120, or other processor-enabled module, may access this stored historical data. Access to the historical data may allow the EWT module 120 to analyze and even select EWT algorithms to apply to current and/or future work items as described above. Additionally, the historical data may be used by the EWT module 120 to compile accuracy and calculation resource usage of each EWT algorithm. This compiled usage may be stored as a rating associated with one or more of the algorithms, contact center conditions, and/or work items. One or more EWT algorithms may be modified and/or generated to refine future EWT calculations based on the data stored in the historical data field 624.

The comparisons field 628 may comprise data related to past (e.g., historical) and/or present comparisons made between EWT algorithm results and actual wait times. Data in this field may be stored in a table that is capable of being modified, edited, replaced, and/or removed. Moreover, this data may be associated with any of the aforementioned attributes of a work item and/or contact center. In some embodiments, the comparisons field 628 may include ratings and/or a ranking between EWT algorithms, especially for given scenarios.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method comprising:
    at a first time applying, by a processor, a first Estimated Wait Time ("EWT") algorithm to a first work item of a contact center to obtain a first EWT, wherein the first work item corresponds to a contact received in a waiting queue;
    at the first time applying, by the processor, a second EWT algorithm to the first work item of the contact center to obtain a second EWT; and
    determining, by the processor, a preferred EWT algorithm, wherein the preferred EWT algorithm is selected from one of the applied first and second EWT algorithms, and wherein determining the preferred EWT algorithm further comprises:
        determining an actual wait time for the first work item that corresponds to an actual amount of time that elapsed between the first time and a second time, wherein the second time corresponds to when the first work item is assigned to a resource;
        comparing the first EWT with the actual wait time to determine a first difference;
        comparing the second EWT with the actual wait time to determine a second difference; and
        selecting, by the processor, and as the preferred EWT algorithm, one of the applied first and second EWT algorithms based on rules, wherein the rules use at least one of the first and second difference.

2. The method of claim 1, wherein the method is performed in at least one of real-time and near-real-time.

3. The method of claim 1, wherein the method is performed by a processor that is at least one of on-board and associated with the contact center and off-board and separate from the contact center.

4. The method of claim 1, wherein the first EWT algorithm corresponds to a first preferred EWT algorithm for a first subset of skills, and wherein the second EWT algorithm corresponds to a second preferred EWT algorithm for a second subset of skills.

5. The method of claim 1, wherein prior to selecting one of the applied EWT algorithms the method further comprises:
    at the first time applying, by the processor, a third EWT algorithm to the first work item to obtain a third EWT; and
    comparing the third EWT with the actual wait time.

6. The method of claim 1, further comprising:
    associating the preferred EWT algorithm with at least one of a contact center condition, work item, work item media type, and default estimated wait time algorithm selection.

7. The method of claim 1, further comprising:
    determining a first calculation resource use of the first EWT algorithm; and
    determining a second calculation resource use of the second EWT algorithm, wherein the first and second calculation resource use includes at least one of processing requirements, time, and data storage used by an EWT algorithm to obtain an EWT.

8. The method of claim 7, wherein the rules used in determining the preferred EWT algorithm further comprise:
    determining a first relationship between the first difference and the first calculation resource use;
    determining a second relationship between the second difference and the second calculation resource use; and
    ranking each EWT algorithm according to predetermined rank criteria, wherein a preferred EWT algorithm is selected based on rank.

9. A non-transitory computer readable information storage medium comprising instructions that, when executed by a processor, perform the method:
    at a first time applying, by a processor, a first Estimated Wait Time ("EWT") algorithm to a first work item of a contact center to obtain a first EWT, wherein the first work item corresponds to a contact received in a waiting queue;
    at the first time applying, by the processor, a second EWT algorithm to the first work item of the contact center to obtain a second EWT; and
    determining, by the processor, a preferred EWT algorithm, wherein the preferred EWT algorithm is selected from one of the applied first and second EWT algorithms, and wherein determining the preferred EWT algorithm further comprises:
        determining an actual wait time for the first work item that corresponds to an actual amount of time that elapsed between the first time and a second time, wherein the second time corresponds to when the first work item is assigned to a resource;
        comparing the first EWT with the actual wait time to determine a first difference:
        comparing the second EWT with the actual wait time to determine a second difference; and
        selecting, by the processor and as the preferred EWT algorithm, one of the applied first and second EWT algorithms based on rules, wherein the rules use at least one of the first and second difference.

10. The non-transitory computer readable information storage medium of claim 9, wherein the first EWT algorithm corresponds to a first preferred EWT algorithm for a first subset of skills, and wherein the second EWT algorithm corresponds to a second preferred EWT algorithm for a second subset of skills.

11. The non-transitory computer readable information storage medium of claim 9, wherein the instructions further comprise:
    associating the preferred EWT algorithm with at least one of a contact center condition, work item, work item media type, and default estimated wait time algorithm selection.

12. The non-transitory computer readable information storage medium of claim 9, wherein the instructions further comprise:
    determining a first calculation resource use of the first EWT algorithm; and
    determining a second calculation resource use of the second EWT algorithm, wherein the first and second calculation resource use includes at least one of processing requirements, time, and data storage used by an EWT algorithm to obtain an EWT.

13. The non-transitory computer readable information storage medium of claim 12, wherein the instructions further comprise:
   determining a first relationship between the first difference and the first calculation resource use;
   determining a second relationship between the second difference and the second calculation resource use; and
   ranking each EWT algorithm according to predetermined rank criteria, wherein a preferred EWT algorithm is selected based on rank.

14. The non-transitory computer readable information storage medium of claim 9, wherein prior to selecting one of the applied EWT algorithms the method further comprises:
   at the first time applying, by the processor, a third EWT algorithm to the first work item to obtain a third EWT; and
   comparing the third EWT with the actual wait time.

15. A contact center, comprising:
   a work assignment engine configured to assign work items received at the contact center to resources of the contact center; and
   an Estimated Wait Time ("EWT") module configured to:
      at a first time apply a first EWT algorithm to a first work item of a contact center to obtain a first EWT, wherein the first work item corresponds to a contact received in a waiting queue;
      at the first time apply a second EWT algorithm to the first work item of the contact center to obtain a second EWT; and
      determine, by a processor, a preferred EWT algorithm, wherein the preferred EWT algorithm is selected from one of the applied first and second EWT algorithms, and wherein the EWT module in determining the preferred EWT algorithm is further configured to:
         determine an actual wait time for the first work item that corresponds to an actual amount of time that elapsed between the first time and a second time, wherein the second time corresponds to when the first work item is assigned to a resource;
         compare the first EWT with the actual wait time to determine a first difference:
         compare the second EWT with the actual wait time to determine a second difference; and
         select, as the preferred EWT algorithm, one of the applied first and second EWT algorithms based on rules, wherein the rules use at least one of the first and second difference.

16. The contact center of claim 15, wherein the EWT module is further configured to:
   associate the preferred EWT algorithm with at least one of a contact center condition, work item, work item media type, and default estimated wait time algorithm selection.

17. The contact center of claim 15, wherein the EWT module is further configured to:
   determine a first calculation resource use of the first EWT algorithm; and
   determine a second calculation resource use of the second EWT algorithm, wherein the first and second calculation resource use includes at least one of processing requirements, time, and data storage used by an EWT algorithm to obtain an EWT.

18. The contact center of claim 17, wherein the preferred EWT module is further configured to:
   determine a first relationship between the first difference and the first calculation resource use;
   determine a second relationship between the second difference and the second calculation resource use; and
   rank each EWT algorithm according to predetermined rank criteria, wherein a preferred EWT algorithm is selected based on rank.

19. The contact center of claim 15, wherein prior to selecting one of the applied EWT algorithms the EWT module is further configured to:
   at the first time apply, by the processor, a third EWT algorithm to the first work item to obtain a third EWT; and
   compare the third EWT with the actual wait time.

20. The contact center of claim 15, wherein the processor is at least one of on-board and associated with the contact center and off-board and separate from the contact center.

* * * * *